Figure 1:
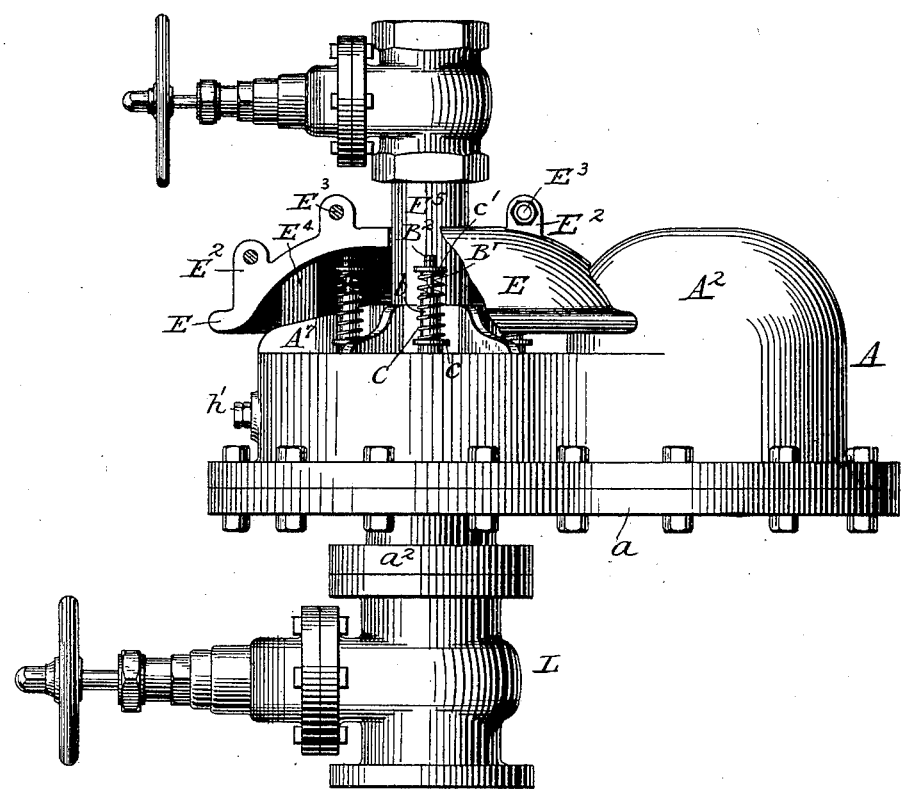

No. 657,896. Patented Sept. 11, 1900.
E. L. ROWE.
AIR CONTROLLING VALVE.
(Application filed Mar. 1, 1899.)
(No Model.) 3 Sheets—Sheet 1.

No. 657,896. Patented Sept. 11, 1900.
E. L. ROWE.
AIR CONTROLLING VALVE.
(Application filed Mar. 1, 1899.)

(No Model.) 3 Sheets—Sheet 2.

No. 657,896. Patented Sept. 11, 1900.
E. L. ROWE.
AIR CONTROLLING VALVE.
(Application filed Mar. 1, 1899.)
(No Model.) 3 Sheets—Sheet 3.

UNITED STATES PATENT OFFICE.

ELLIS L. ROWE, OF TROY, NEW YORK.

AIR-CONTROLLING VALVE.

SPECIFICATION forming part of Letters Patent No. 657,896, dated September 11, 1900.

Application filed March 1, 1899. Serial No. 707,343. (No model.)

*To all whom it may concern:*

Be it known that I, ELLIS L. ROWE, of Troy, in the county of Rensselaer and State of New York, have invented certain new and useful Improvements in Air-Controlling Valves; and I hereby declare that the following is a full, clear, and exact description thereof, reference being had to the accompanying drawings, which form part of this specification.

This invention is an improvement in air-controlling valves for use in connection with water-supply systems or other apparatus wherein it is desired to control the admission and egress of air as may be required by the ebb and flow of water in the pipes of such system or apparatus without permitting waste of the fluid. Such valves are particularly designed for use in steel-riveted water-pipe lines to take care of the air under any and all conditions which arise in practice in this department of hydraulic engineering.

As shown, the valve is more particularly an improvement upon the automatic air-valve shown in the patent to Gubelman, No. 567,093, of September 1, 1896.

These valves are designed to automatically let air out of the pipe or conduit while it is being filled with water and to also automatically let air into the pipe when from any cause the water is suddenly partially or wholly withdrawn therefrom. These valves are usually placed at the most elevated points on the line, and consequently the sudden withdrawal of a large quantity of water from the pipe at a lower point would create a vacuum therein unless provision is made to admit air thereto, and such a vacuum would cause the collapse and ruin of the pipe-lines or other apparatus of similar nature unable to withstand the exterior pressure due to the vacuum created therein. These air-valves also facilitate the filling of the pipes and prevent the formation of air-cushions or hammers therein by permitting the air to escape freely until the water rises to and closes the valves. These are the most important offices of such valves, and the Gubelman valve referred to performs such offices satisfactorily under all normal conditions of operation; but it has been found in the practical use of this class of valves that they do not meet all the requirements of working in such a system and that when once closed under high pressure they may remain closed while cushions of compressed air are formed in the pipes. These trapped-air cushions seriously interfere with the operation of the water-main, and some means for providing against the formation or maintenance of such air-cushions and of counteracting the ill effect thereof has been demanded by hydraulic engineers.

The air-valves are, as stated, placed at high points in the pipe-lines for the purpose of controlling air; but after they have once permitted all air in the pipe to escape and are closed by the water-pressure it is found that air will collect under the same pressure as the water at the higher points in the line, this air entering in minute quantities with the water. As is well known, all flowing water is more or less aerated, and more or less air will separate from the water and collect in the valve-chambers under the same pressure as the water itself, and therefore as this separated air increases in volume it may force the water entirely out of the valve-chamber and back in the main pipe while holding the air-valves securely closed, owing to the compression of such air.

The principal object of the present invention, therefore, is to improve this class of air-valves generally, and the Gubelman valve in particular, by employing in connection therewith an auxiliary automatic relief-valve which will be normally closed by the presence of water in the valve-chamber, but will be automatically opened when an excessive or abnormal amount of compressed air accumulates in the valve-casing.

Another object of the invention is to improve the construction of said valves by reducing the height thereof, so that they can be used at points where it will be inconvenient or impossible to bury the pipe-line at a great depth.

The invention consists in the improved construction of the automatic air-valves and also in the details of construction of said valves and the auxiliary valve hereinafter described and claimed, and illustrated in the accompanying drawings, forming part of this specification, to which I refer by letters of reference marked thereon.

Figure 2:
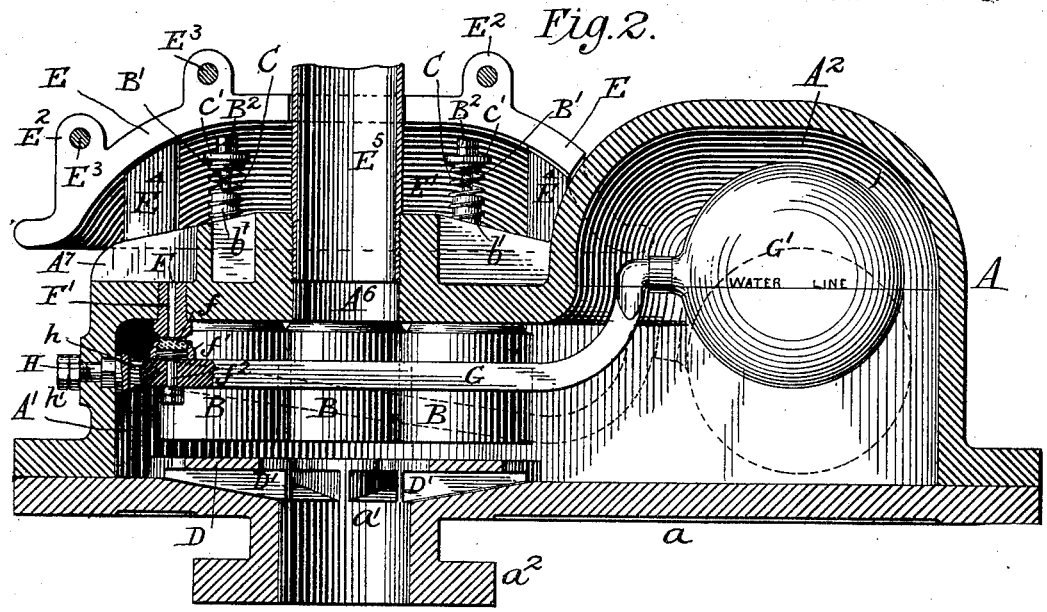
Figure 3:
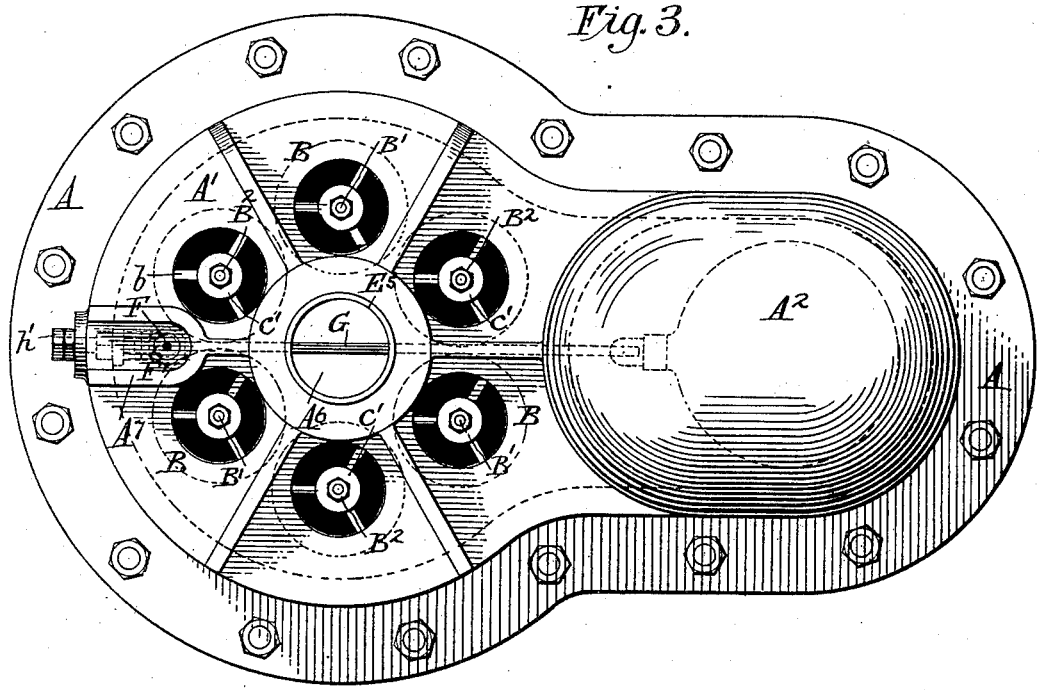
Figure 4:
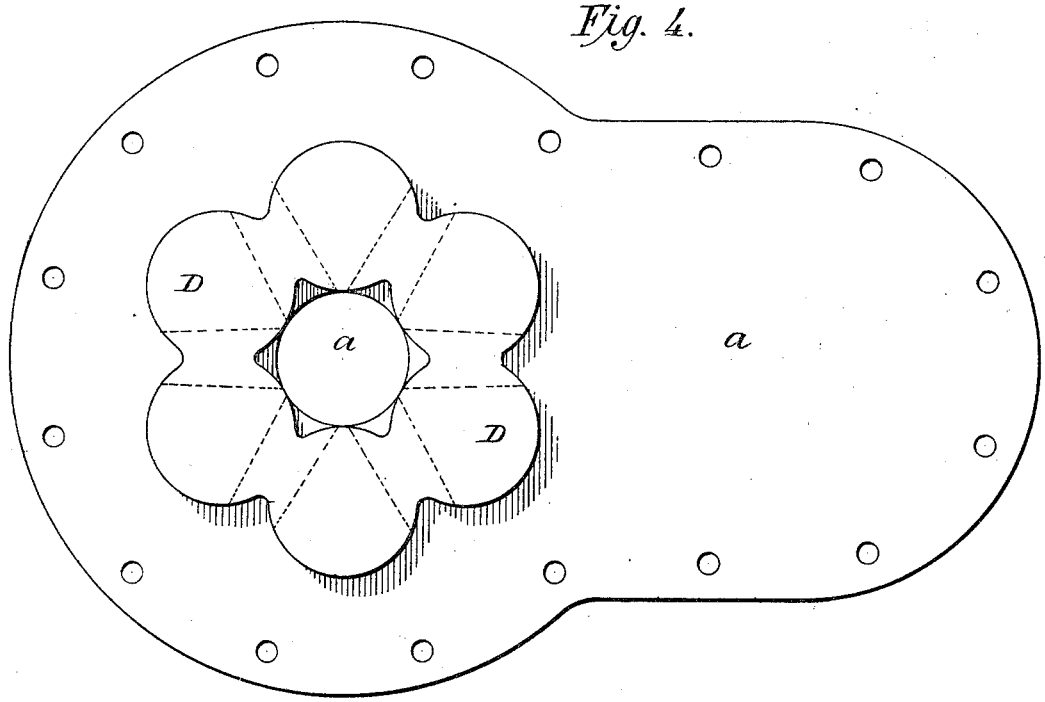
Figure 5:
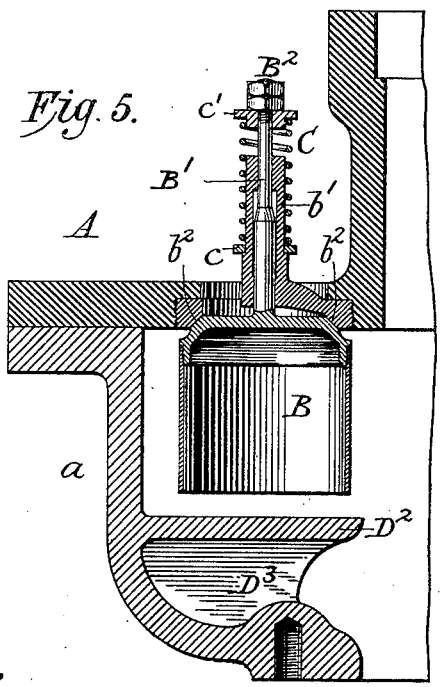

Figure 1 is a side elevation of the valve-casing, showing the hood and the gate-valve connections, the hood being partly in section. Fig. 2 is an enlarged longitudinal vertical sectional view through the valve. Fig. 3 is a top plan view thereof with the protecting-hood removed. Fig. 4 is a top plan view of the bottom plate of the casing. Fig. 5 is an enlarged detail view of one of the automatic air-valves and indicating also a slight modification of the construction of the casing.

The valve-casing, as shown, is formed with a main air-valve chamber $A'$ and with an air-trapping chamber $A^2$ opposite, but rising above the top of the air-valve chamber. These two chambers may be formed in one top casting A and one base-casting $a$, bolted to the base-flange of the upper casting, as indicated in the drawings, said base-casting being provided with an inlet $a'$ in the central line of the valve-chamber, which inlet may be surrounded exteriorly by a flanged collar $a^2$, by which the valve-casing may be bolted to the top flange of a gate-valve L, it being usual, however, to interpose a gate-valve between the air-valve and the pipe-line, so that in case of accident to the air-valve the gate-valve can be closed and the air-valve repaired without interfering with the flow of water in the pipe-line. As shown, there is also a central opening $A^6$ in the top of the valve-chamber, connecting with a pipe $E^5$, which pipe may be provided with an ordinary gate-valve M, which can be opened by hand in case of emergency. The arrangement of gate-valves above and below the air-valve chamber is common in the art and forms no part of the present invention. In the top of said valve-chamber A is a series of vent-openings closed by a series of air-valves B, which are inverted cup-shaped valves closed at their upper ends and provided with vertical stems $B'$, that extend through tubular guides $b'$, attached to spiders $b$, which are secured in the vent-openings in the top wall of the valve-chamber, as shown, and are provided with valve-seats $b^2$, against which the upper ends of the valves B are adapted to seat when the valves are closed.

Springs C are interposed between collars $c$ on the guides $b'$ and washers $c'$ on the upper ends of stems $B'$, these washers being adjustable on the stem by means of nuts $B^2$ on the upper ends of the stems, as shown, so that the valves can be practically suspended on the springs, the tension of which is so adjusted as to approximately sustain the weight of the valve without closing the latter. The springs C should be made of phosphor-bronze or other non-corrodible spring metal.

Below but near the lower open ends of the valves B when said valves are open is a baffle plate or plates D, which are adapted to prevent violent outflow of air closing the valves, which will remain open until practically all the air is forced out of the valve-chamber, and then the air trapped in the hollow valves gives them sufficient buoyancy in the water to easily and gently close them against their seats.

As shown in Figs. 2 and 4, the baffle-plate D is cast integral with the base-casting $a$, being raised from the floor thereof and properly supported by ribs $D'$. As indicated in Fig. 5, the side walls of the valve-chamber are formed integral with the bottom casting instead of being formed in the top casting, as in Fig. 2, and in this case the baffle-plates $D^2$ may be also cast integral with the side walls of the chamber and supported by a web $D^3$. While I consider the formation of the baffle-plates integral with the casing as part of my present invention, I do not limit myself to the employment of integral plates in connection with the air-valves, as baffle-plates might be suspended from the top of the valve-chamber, as in the Gubelman patent aforesaid, for example.

The valve guides, stems, and springs above the top of the valve chamber are protected by a hood E, which is preferably a pan-shaped casting formed in similar halves $E'$, which are provided with lugs $E^2$, by which they can be united by bolts $E^3$, as shown, each half being also provided on its under side with vertical supporting-lugs $E^4$, by which the hood is kept in position over the air-valves, so as to permit free circulation of air to and from the valves, while at the same time protecting them against the weather and accidental injury.

It is desirable in some instances to have the air-valve as flat as possible, and the form which I have illustrated in Figs. 1 and 2 is especially designed to provide a very low valve particularly adapted for use where the water-pipes lie near the surface of the ground at the point where such air-valve is to be located while the valve-chamber is very low. The effective automatic action of the air-valves is maintained by making the cup-valves of greater diameter, so as to contain a sufficient quantity of water to cause the closing thereof at the proper time, as above described.

The construction thus far described forms a most efficient automatic air-valve for controlling the admission and egress of air under the normal working conditions of the system; but the most important part of my invention is the combination, with such air-valve, of means for maintaining its efficiency under abnormal conditions and preventing formation or maintenance of injurious compressed-air cushions in the system. This means consists in a small automatic relief-valve which may be of any suitable construction; but I prefer a float-operated valve, as hereinafter described.

In the top of the valve-chamber is a small opening F, which may be formed by a small tube $F'$. The inner end of this opening is normally closed, however, by means of a flap or cushion valve $f$, which is preferably a pad of rubber or fiber secured to the head of a bolt $f^2$ by means of a coupling-nut $f'$, as shown in Fig. 3, the bolt $f^2$ being secured to a lever G near the pivot thereof, said lever being adapted to swing vertically, and is pivoted to the bifurcated head $h$ of a bolt H, projecting through the side wall of the valve and secured by nuts $h'$, as shown. This construction enables the valve $f'$ to be accurately adjusted to close the opening F; but I do not limit myself to the particular construction of the valve shown, nor to the particular connection of the lever G to the side wall of the valve-casing, except where specifically referred to in the claims. The lever G extends transversely into the chamber $A^2$, where its extremity is connected to a float $G'$, which is preferably made hollow and of very light seamless copper, like other floats used for like purposes. The float $G'$ may be connected to the lever at such a point that it will open the relief-valve when sufficient air is accumulated in the chamber $A^2$ and valve-casing to force the water to or just below the level of the inner end of tube $F'$.

On top of the valve-casing, around the upper end of opening F, is a vertical flange $A^7$, by which any water escaping through opening F is directed off the top of the valve-casing and kept away from any of the air-valve openings. The diameter of opening F is preferably quite small, as it is not intended that this relief-valve shall affect the operation of the automatic air-valve under normal working condition of the apparatus, the object of this relief-valve $f$ being to relieve abnormal accumulations of air in the valve-chamber. Under ordinary conditions when the pipes are properly filled with water the valve-chamber $A'$ and chamber $A^2$ will contain so much water that float $G'$ will be upheld and cause valve $f$ to close opening F. There will always be a small body of air trapped in the upper part of chamber $A^2$, as the valve-casing is set in a horizontal position and there is no outlet from the chamber $A^2$ above the top of the main air-valves B. When the system is first filled with water, the valves B are closed by the pressure of water thereagainst; but more or less of the air contained in the water will separate therefrom and will naturally collect at the highest point, which is chamber $A^2$. Of course this air is compressed to a degree equal to the head of water and will therefore keep the valves B closed, even if it should accumulate in sufficient volume to force the water out of the valve-chamber and back into the pipes. As before stated, this has sometimes occurred, and the air-valves will not relieve this abnormal excessive air-pressure, and in this condition of affairs the relief-valve becomes exceedingly useful. When the air collects in chamber $A^2$ under such pressure that the automatic air-valves cannot discharge it, the air will eventually force the water down therein, and when so much air is accumulated as will lower the water to a certain limit in chamber $A^2$ the float $G'$, which descends with the water, depresses lever G and moves valve $f$ away from opening F, which then serves as a vent through which the air escapes until the pressure is relieved and the water again rises in chamber $A^2$ sufficiently to cause the float to raise the lever and again close valve $f$.

The operation of the combined valve will be obvious from the foregoing—that is, the air-valves will open and close automatically, taking care of sudden or voluminous influx or egress of air in the pipes caused by the ebb and flow of water therein until such pressure accumulates in the pipe as will close these valves and prevent their automatic operation. Then the relief or float valve will take care of any abnormal collections of air in the chamber $A^2$, which air accumulates there under pressure and on account of such accumulation prevents the proper flow of water through the pipes.

The small vent-valve $f$ is essential to the operativeness of the valves B, as without the valve $f$ the valves B after being once closed by the pressure of the water and air would be kept closed so long as the pressure was maintained in the pipes, no matter how much air might collect therein; but by providing the small relief-valve the automatic operation of the large valve under all conditions is insured. The large valves B are essential to prevent collapse of the pipes when water is suddenly withdrawn therefrom, and the small vent $f$ would be totally inadequate on such occasions and the pipes would be crushed by external pressure, while on the other hand the large valve B would be held closed under abnormal pressures, and thus the flow of water through the system would be materially if not wholly checked. Therefore the two valves have a corelation and coaction in that the larger valves would be held closed were they not relieved by the action of the smaller valve.

Having thus described my invention, what I therefore claim as new, and desire to secure by Letters Patent thereon, is—

1. The combination with the valve-chamber, a trapped-air chamber at one side of and communicating with the valve-chamber, a float in said air-chamber, and the auxiliary valve controlled by said float, substantially as described.

2. The combination of the valve-chamber, a trapped-air chamber at one side of and communicating with the valve-chamber; with the pivoted lever extending into the air-chamber, a float on said lever within the air-chamber, and the auxiliary valve in the valve-chamber controlled by said float whereby the accumulations of air under such excessive pressure as would hold the main air-valves closed will be automatically relieved, substantially as described.

3. In an air-controlling valve, the combination of the two-part casing having an air-valve chamber, an air-trapping chamber, a water-inlet in the bottom of the valve-chamber, the small vent-opening in the top of the casing, the pivoted lever extending into the air-chamber, the float on the end of said lever within the air-chamber, and the valve on said lever adapted to close the vent-opening when the float is raised, substantially as and for the purpose described.

4. The combination of the valve-casing having an inlet-opening, and a vent-opening, the inverted-cup-shaped valve adapted to close said vent-opening and provided with a stem, the removable exterior tubular guide for said stem, and the spring partially surrounding said guide and supporting said valve-stem, and the baffle-plate below the lower open end of said valve.

5. The combination with the valve-casing, the water-inlet thereto, the vent-opening in the top of said casing, the valve-seat in said opening provided with an exteriorly-projecting tubular guide, and the inverted-cup-shaped valve closed at its upper end and provided with a stem extending through said tubular guide, the spring surrounding said guide and supporting said valve, and a baffle-plate beside the lower open end of said valve, substantially as described.

6. The combination of the valve-casing, the water-inlet thereto, the vent-opening in the top of said casing, the removable valve-seat in said opening provided with a tubular guide, and the inverted-cup-shaped valve closed at its upper end and provided with a stem extending through said tubular guide; with a washer on the upper end of said stem, the adjusting-nuts for said washer on said stem, the spring surrounding said guide and supporting said valve, and a baffle-plate beside the lower open end of said valve, substantially as described.

7. The combination of the air-valve chamber having a water-inlet in its bottom, the vent-openings in its top, the series of inverted-cup-shaped air-valves closing said openings provided with stems projecting above the top of the casing and the baffle-plates below and opposite the lower open ends of said valves, and the exterior superimposed housing or hood supported on and attached to said casing and protecting the air-valves, substantially as described.

8. The combination of the casing having an air-valve chamber, a water-inlet in its bottom, and vent-openings in its top; and the series of inverted-cup-shaped air-valves closing said vent-openings and provided with stems projecting above the top of the casing; with the removable valve seats and guides and supporting-springs above the casing; the baffle-plates below and opposite the lower open ends of said valves formed rigidly with the casing; and the housing or hood supporting on said casing and extending over and protecting the air-valve guides and springs, substantially as described.

9. The combination of the valve-casing containing an air-valve chamber, and an air-trapping chamber and having a water-inlet in the bottom of the valve-chamber, and a series of vent-openings in the top of said chamber, the removable valve-seats in said openings provided with upstanding tubular guides, the inverted-cup-shaped air-valves closing said openings, the springs surrounding said guides for equalizing the weight of said air-valves and the baffle-plates opposite the lower ends of said valves formed integral with the casing; with the vent-tube in the valve-chamber, the pivoted lever extending through the valve-chamber into the air-chamber, the float on the end of said lever within the air-chamber, and the valve on said lever near the pivot thereof adapted to close the vent-tube, all substantially as and for the purpose set forth.

In testimony that I claim the foregoing as my own I affix my signature in presence of two witnesses.

ELLIS L. ROWE.

In presence of—
  R. J. RASMUSER,
  MILTON E. ABLETT.